Aug. 30, 1949.     C. E. HANSEN ET AL     2,480,364
APPARATUS FOR ASSEMBLING AND SEALING
GLASS AND METAL PARTS

Filed Aug. 20, 1948     4 Sheets-Sheet 2

INVENTORS
C. E. HANSEN
J. W. JUVINALL
BY
ATTORNEY

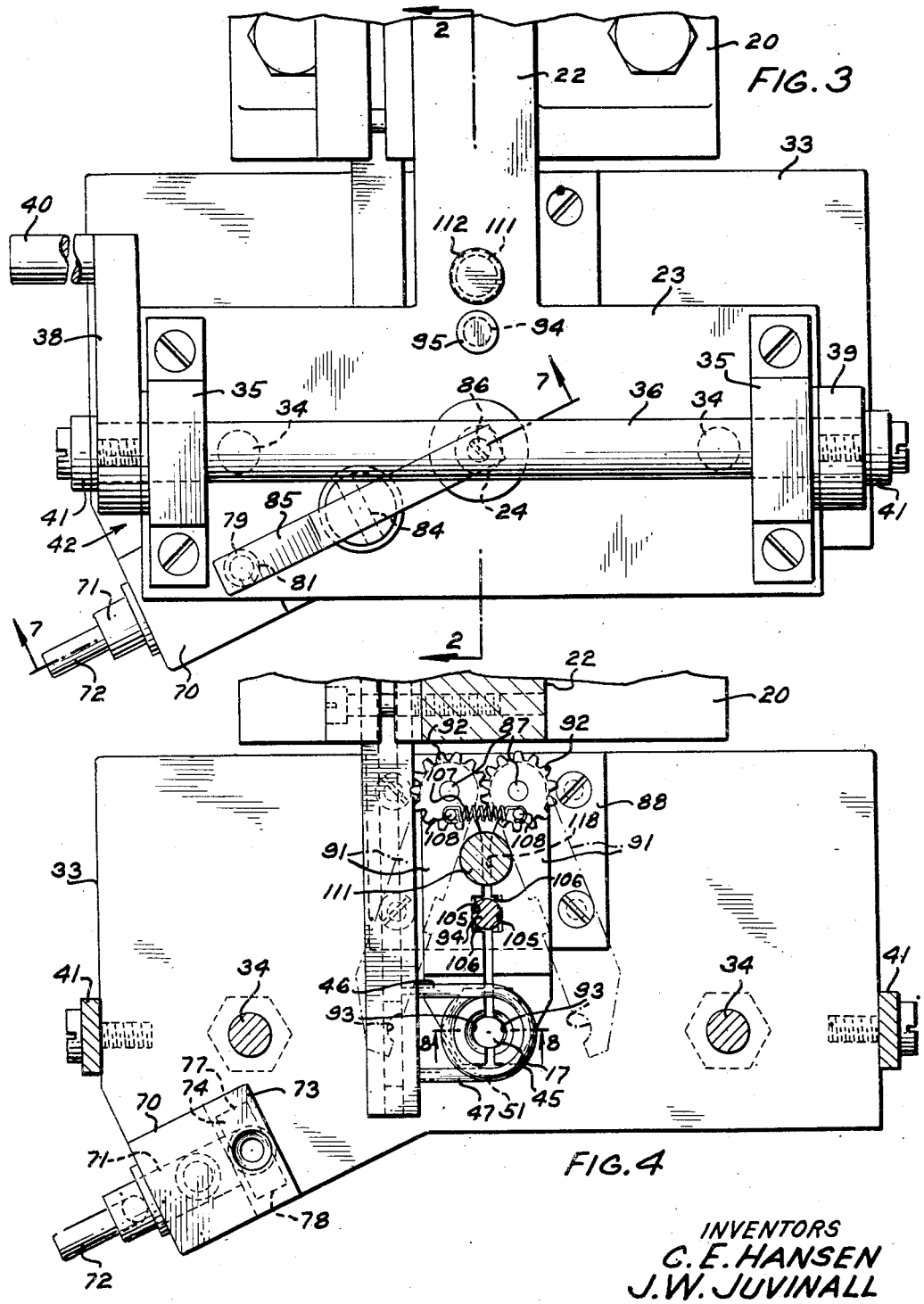

Aug. 30, 1949.  C. E. HANSEN ET AL  2,480,364
APPARATUS FOR ASSEMBLING AND SEALING
GLASS AND METAL PARTS
Filed Aug. 20, 1948  4 Sheets-Sheet 4
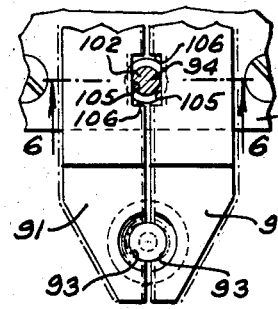
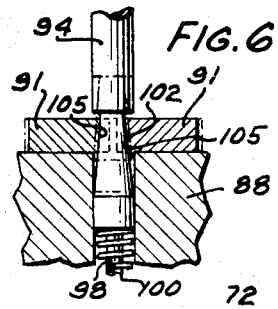
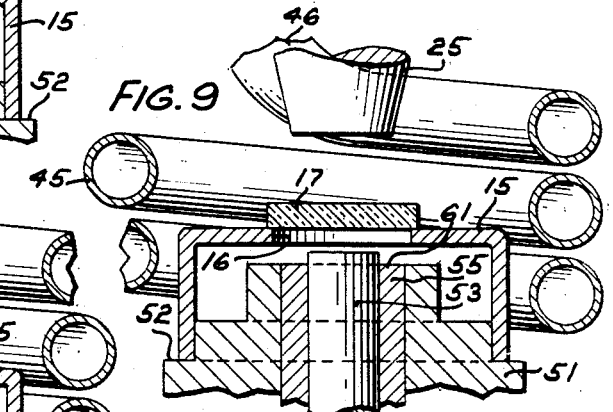
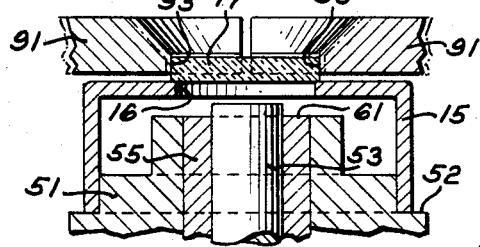
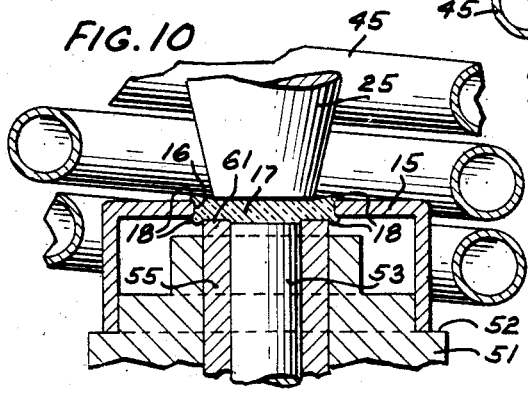
INVENTORS
C. E. HANSEN
J. W. JUVINALL
BY
ATTORNEY Patented Aug. 30, 1949

2,480,364

UNITED STATES PATENT OFFICE 2,480,364

APPARATUS FOR ASSEMBLING AND SEALING GLASS AND METAL PARTS

Carl E. Hansen, Hicksville, N. Y., and James W. Juvinall, La Grange Park, Ill., assignors to Western Electric Company, Incorporated, New York, N. Y., a corporation of New York Application August 20, 1948, Serial No. 45,314

10 Claims. (Cl. 49—1)

1

This invention relates to apparatus for assembling and sealing glass and metal parts, and more particularly to apparatus for aligning and sealing glass windows in apertured cup-shaped metal parts of vacuum tubes.

An object of this invention is the provision of an apparatus for accurately and expeditiously aligning and sealing glass and metal parts.

In accordance with the above object, this invention contemplates, in one embodiment thereof, an apparatus by means of which an optical glass window is aligned with and sealed in an apertured wall of a metal cup for a vacuum tube, wherein the cup is first mounted in an inverted position upon a reciprocable support. Thereafter, an optical glass window is placed upon and aligned with the aperture in the cup which is to receive it. The support is then actuated by means of a hand actuated mechanism to elevate the assembled cup and window into the field of a stationary high frequency coil whereat the cup is sufficiently heated to render the peripheral edges of the glass window plastic by the heat transmitted to it from the heated cup. A second hand actuated cam and lever mechanism is then actuated to lower a plunger coaxially aligned with and enterable into the coil into engagement with an upper central area of the window to press it into the aperture of the cup and also press the lower central area of the window, which is plastic, at its periphery, against an end surface of an aligned abutment lying a slight distance below the plane of the lower surface of the apertured wall of the cup and in timed relation therewith a reciprocable sleeve-like anvil slidable upon the periphery of the abutment is raised to engage and press against an annular area of the window intermediate its plastic periphery and the abutment to cause, in cooperation with the plunger, the molten glass to flow and overlap annular upper and lower edges defining the aperture in the cup, thus firmly locking or fixing the glass window in the aperture.

Other objects and advantages of the invention will be apparent from the following detailed description taken in conjunction with the accompanying drawings, in which Fig. 1 is a fragmentary front elevational view of the apparatus of this invention, the parts of the apparatus being shown in an inoperative position with a metal cup and glass window in position on the reciprocable support prior to being raised for heating and sealing;

Fig. 3 is a fragmentary plan view of Fig. 1 in the direction of line 3—3, Fig. 1;

Fig. 4 is a fragmentary plan sectional view taken on the line 4—4 of Fig. 1;

Fig. 5 is a fragmentary plan view of a glass

2 window aligning mechanism shown in its operative position;

Fig. 6 is a fragmentary vertical sectional view taken on the line 6—6 of Fig. 5;

Fig. 7 is a fragmentary vertical sectional view taken on the line 7—7 of Fig. 3 showing the metal cup and glass window in their raised positions for heating and sealing after actuation of the reciprocable support;

Fig. 8 is an enlarged fragmentary vertical sectional view taken on the line 8—8 of Fig. 4 showing the metal cup on its support with the glass window centered on the cup by the aligning mechanism;

Fig. 9 is a view similar to Fig. 8 after withdrawal of the aligning mechanism and actuation of the reciprocable support to carry the aligned parts into position with respect to the high frequency coil for heating and sealing; and Fig. 10 is a view similar to Fig. 9 showing the positions of the reciprocable support, plunger and anvil upon completion of the sealing of the glass window in the aperture of the metal cup.

Although not limited thereto, apparatus embodying the features of the invention may be employed to advantage for aligning, heating and sealing glass and metal parts of an assemblage used in a vacuum tube. As shown particularly in Figs. 8, 9 and 10, such an assemblage may comprise an inverted cup-like metal member 15 having a central aperture 16 in its upper circular wall into which is inserted an optical glass window 17, the window, as shown in Fig. 9, being suitably larger in diameter than that of the aperture and in a plastic molten condition around its peripheral edge when inserted into the aperture of the cup, which is heated at the time. In the final finishing operation on the assemblage, the molten glass, at the peripheral edge of the window, as indicated at 18 in Fig. 10, has flowed outwardly to interlock with the upper and lower peripheral edges of the aperture 16 in the cup 15.

Figure 1:
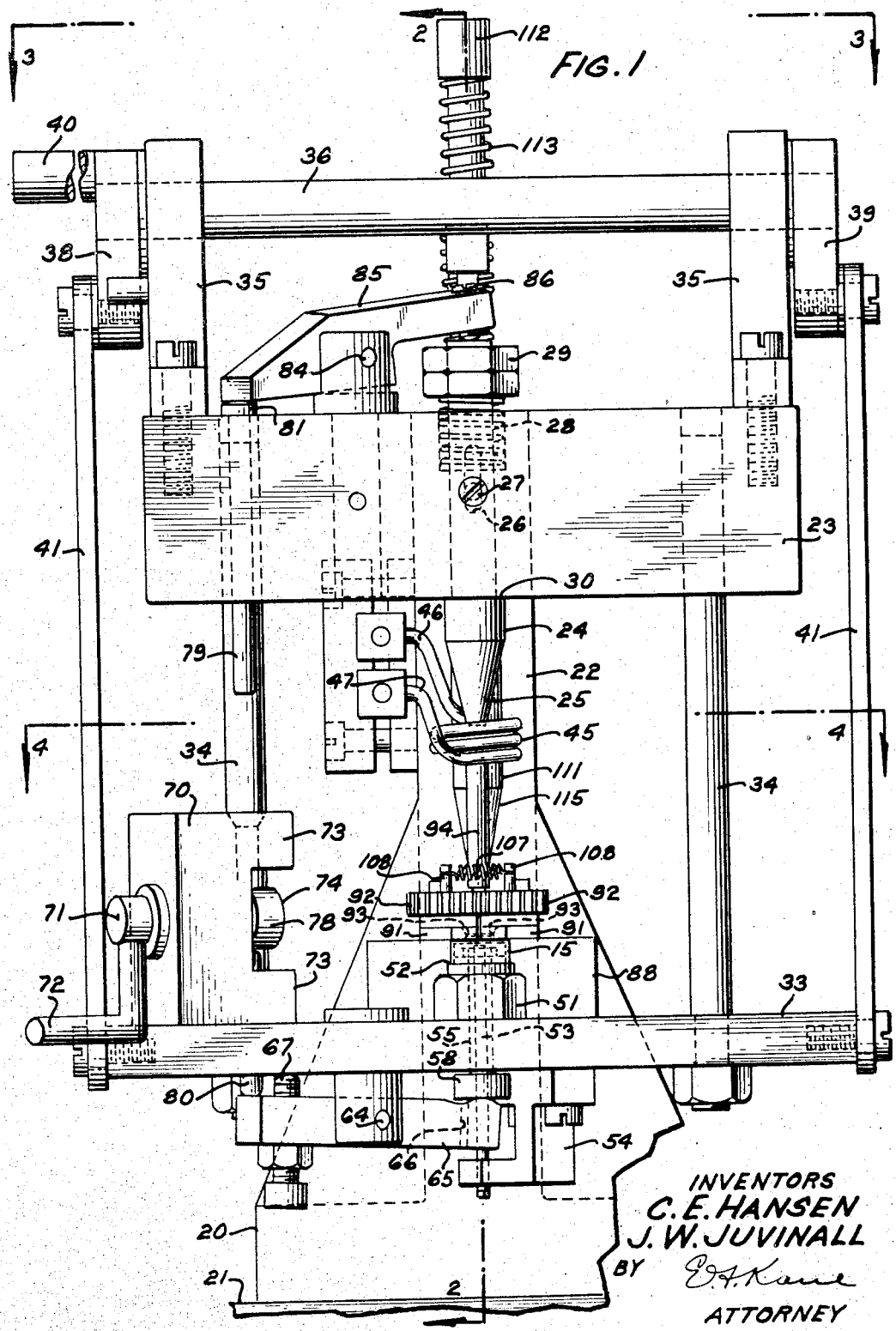
Figure 2:
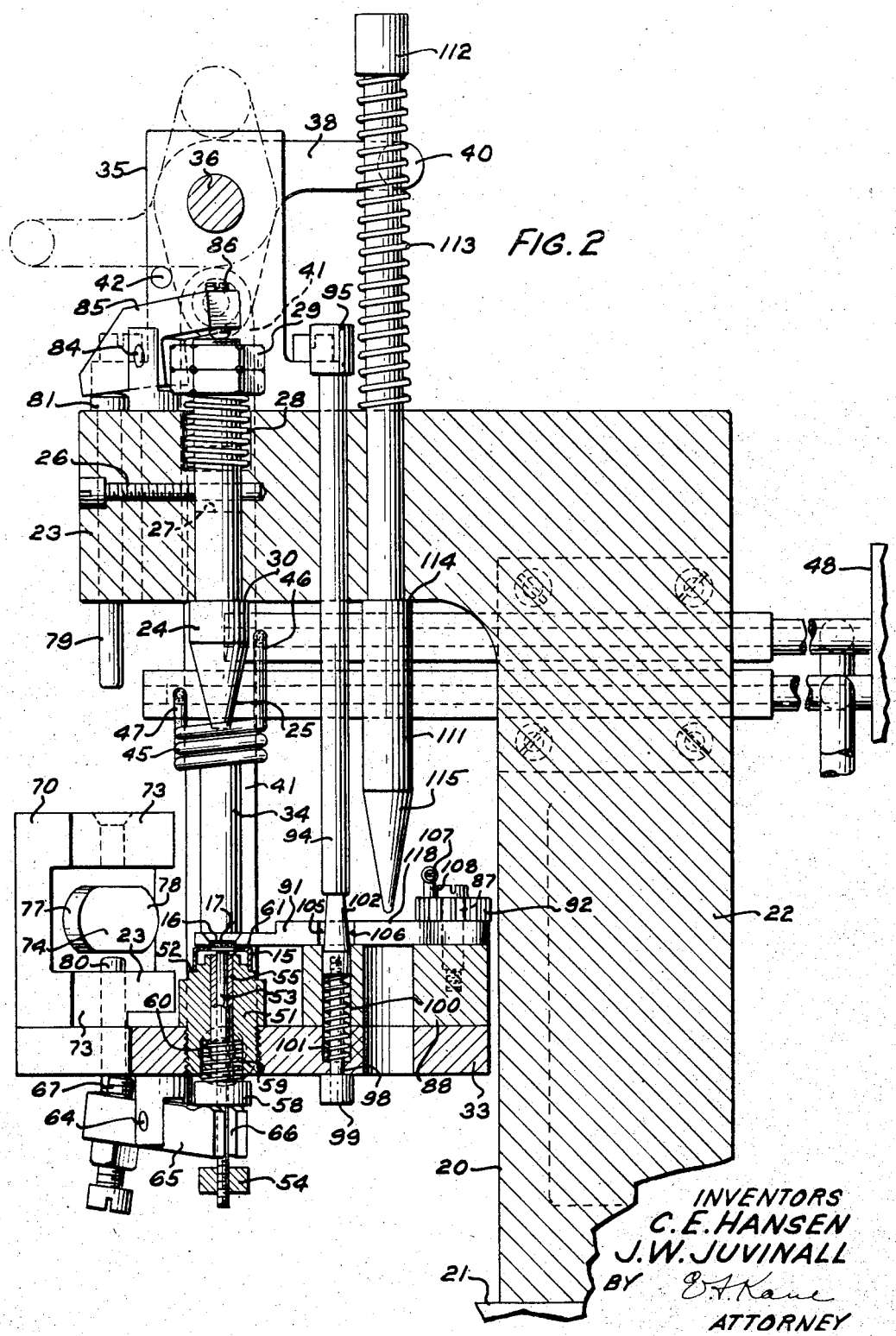
Fig. 2 is a fragmentary vertical sectional view taken on the line 2—2 of Fig. 1 and Fig. 3.

Referring now to the drawings in detail and particularly to Figs. 1 and 2, the apparatus comprises a frame or base member 20, which may be fixed to a bench top or other support 21, the base member having a vertical portion 22 terminating at its upper end in an overhanging horizontal arm 23. Reciprocably carried in the arm 23 is a vertical shouldered plunger 24 having a tapered work engaging lower end 25. In order to prevent rotation of the plunger 24 while still permitting reciprocation thereof, a pin and slot arrangement is provided, as indicated at 26 and 27, respectively. A compression spring 28 surrounding the upper reduced end of the plunger 24, with its opposite ends engaging a shouldered surface in the arm 23 and a stop nut assemblage 29 adjustably threaded onto the plunger above the arm 23 is effective to normally maintain the plunger in its uppermost position with a shouldered surface 30 of the plunger abutting the lower surface of the arm 23, as clearly shown in Figs. 1, 2 and 7. The stop nut assemblage 29 serves to limit the downward movement of the plunger 24.

Below the arm 23 is a horizontal reciprocable plate or table 33, which is attached to the lower ends of a pair of guide rods 34 freely slidable up and down in apertures in the arm 23. For raising and lowering the table 33, the following mechanism is provided: Mounted upon opposite ends of the arm 23, as viewed in Figs. 1 and 3, is a pair of journal blocks 35 in which is journalled a shaft 36 having opposite ends fixed to aligned crank arms 38 and 39. The arm 38 is provided with a right angle extension equipped with a handle 40. Pivotally connected at its upper end to each of the arms 38 and 39 is a depending link 41, the lower ends of which are similarly connected to opposite ends of the table 33. As shown in Figs. 1 and 2, the table 33 is in its lowermost position with the crank arm 38 resting against a stop pin 42 fixed to the left hand journal block 35. When it is desired to raise the table 33, the crank arm 38 is rotated 180° in a counter-clockwise direction to the broken outline position shown in Fig. 2, in which position the extension thereof rests against the stop pin 42.

Between the lower surface of the base arm 23 and the table 33 is a stationary high frequency coil 45, which is coaxially aligned with the plunger 24, the coil comprising a plurality of helically arranged turns of copper tubing through which water is circulated for cooling purposes in a suitable manner (not shown). Terminal portions 46 and 47 extending from the coil are suitably insulatedly supported, together with the coil, from the vertical base portion 22, and are electrically connected to a suitable electrical transformer 48, shown fragmentarily in Fig. 2. The hollow of the coil 45 is of such dimensions that the plunger 24, with its lower end 25 and the cup 15, as particularly shown in Fig. 10, may freely enter thereinto.

Screw-threaded into an aperture in the table 33 is a shouldered supporting sleeve 51 for the cup-like member 15, the sleeve having a diameter at its upper end for freely receiving the inner diameter of the cup-like member, which rests at its annular lower edge surface upon an annular shouldered surface 52 of the supporting sleeve 51 (Figs. 7, 8, 9 and 10). As thus supported, the cup 15 is coaxially aligned with the plunger 24 arranged thereabove. Also fixed to the plate or table 33 is a vertically adjustable rod or abutment member 53 having its upper end face lying a slight distance below the plane of the lower surface of the apertured upper wall of the cup 15. The abutment member 53 is screw-threaded at its lower end into a horizontal arm of an L-shaped bracket 54 fixed to the lower surface of the table 33 (Fig. 7). Arranged between the outer and inner peripheries of the abutment member 53 and supporting sleeve 51, respectively, and freely slidable thereon is a reciprocatory sleeve-like anvil 55, which is flanged at its lower end at 58. Surrounding the sleeve 55, and within an enlarged inner diameter of the supporting sleeve 51, is a coiled compression spring 59 having its opposite ends engaging a shouldered surface 60 provided by the enlarged inner diameter of the sleeve 51 and the opposed annular surface of the flange 58 of the sleeve 55, which normally acts to press the sleeve 55 downward to position its upper annular anvil-like end face 61 below the plane of the upper end face of the abutment member 53, as shown in Figs. 7, 8 and 9, and into the plane of the upper annular end face of the supporting sleeve 51.

Pivoted, as indicated at 64 (Fig. 7), below the lower surface of the table 33, is an actuating lever 65 for the sleeve-like anvil 55, the right hand end of the lever being bifurcated, as indicated at 66, and its furcations being spaced from the abutment member 53 and engaging the flange 58 of the sleeve 55. In the normal position of the sleeve 55 and lever 65 (Fig. 7) under the action of the spring 59, an adjustable stop screw 67 on the lever engages the lower surface of the table 33, thus limiting the movement of the lever in a clockwise direction. It will be apparent that upon rocking the lever 65 in a counter-clockwise direction about its pivot 64, the sleeve 55 may be raised to carry its upper face 61 above the plane of the upper end face of the abutment member 53 (Fig. 10), the engagement of the flange 58 of the sleeve 55 with the lower surface of the table 33 limiting such movement. Journalled in a U-shaped block 70 carried upon the table 33 at its left hand end, as viewed in Figs. 1, 2, 4 and 7, is a horizontal shaft 71 (Fig. 7), to which is fixed at one end a hand crank 72, the opposite end extending into the space between parallel horizontal arms 73 of the block 70 and having fixed thereto a cam member 74 provided with two lobes 77 and 78. Slidable in the upper and lower arms 73 of the block 70 are coaxially aligned push rods 79 and 80, respectively (Fig. 7), arranged to be engaged by the cam lobes 77 and 78 during rotation of the shaft 71. The push rod 79, which is also slidably carried in the horizontal arm 23 of the base member 20, is provided with a head 81 at its upper end which normally abuts the upper surface of the arm 23, as shown in Fig. 7, in which position the lower end face of the push rod freely engages a low point of the cam member 74 when the table 33 is in its upper position (Fig. 7). Pivoted on the arm 23 at 84 is a lever 85 having one end abutting the head 81 of the push rod 79 and its opposite end carries an adjustable screw 86, which engages the upper end face of the plunger 24, the compression spring 28 normally acting to maintain the parts in the positions as shown in Fig. 7.

The lower end face of the push rod 80 normally freely abuts or rests upon the upper surface of the lever 65, in which position and with the cam member 74 in its inoperative position, as shown in Figs. 2 and 7, its upper end face is suitably spaced from the low point of the cam member. With this described relation of the lower and upper end faces of the push rods 79 and 80, respectively, to the low points of the cam member 74, the table 33 being in its upper position and the cam member positioned as shown in Fig. 7, it will be apparent that upon rotating the cam member 74 90° in either direction by means of the hand crank 72, the push rods will be moved in opposite directions, the movement of the rod 79 occurring before that of the rod 80. Thus, in timed relation, the levers 85 and 65 will move the plunger 24 with its lower end 25 downwardly and the sleeve-like anvil 55 upwardly to engage and press against the upper and lower surfaces of the glass window 17, as clearly shown in Fig. 10.

In order to accurately align the glass window 17 with the aperture 16 in the cup 15 during the assembling of these parts previous to their sealing, the following described mechanism is provided: Pivoted at 87—87 upon the upper surface of a platform 88, fixed upon the table 33, are levers 91, each having fixed thereon a gear 92, which surrounds and is coaxial with its pivot 87, the gears being constantly in mesh. The pivots 87—87 are disposed equal distances at each side of an imaginary line extending perpendicular to the vertical axis of the supporting sleeve 51, abutment member 53 and sleeve 55. Formed in the opposed edge faces of the levers 91 at their free ends are bevelled arcuate formations 93 (Figs. 4, 5 and 8), which engage opposite sides of the window 17 when the levers are operated to the positions shown in Fig. 5 to align the window with the aperture 16 in the cup 15.

Reciprocably slidable in aligned apertures in the base arm 23 and the block 88 on the table 33 is a plunger 94 (Figs. 2, 4, 5 and 6) having a head 95 at its upper end which is above the upper surface of the base arm. The plunger 94 is arranged on an imaginary line extending between the pivots 87 of the levers 91 and perpendicularly to the vertical axis of the base supporting member 51, anvil sleeve 55 and abutment member 53. Coaxially threaded into the lower end face of the plunger 94 is a shouldered rod 98, an intermediate diameter of which is slidably fitted in a shouldered aperture in the table 33 and a larger diameter forms a stop portion 99 (Fig. 2) at its lower end, normally abutting the lower surface of the table 33. Surrounding the rod 98 is a coiled compression spring 100, having its opposite ends abutting the lower end face of the plunger 94 and an annular surface 101 of the shouldered aperture in the table 33. The spring 100 normally serves to maintain the plunger 94 in its uppermost position, as shown in Fig. 2. Formed on the plunger 94 is a frusto-conical stop portion 102 for the levers 91, the stop portion having its smaller diameter uppermost, the tapered peripheral surface of the plunger portion being arranged to engage inclined vertically directed opposed plane faces 105 of aligned recesses 106 formed in opposed edge faces of the window aligning levers 91, when they are in their full line positions, as shown in Fig. 4. A contractile spring 107, having its opposite ends attached eccentrically to the gears 92, as indicated at 108, serves to normally urge the levers toward each other (Figs. 1, 4, 5 and 8) where their inclined faces 105 abut the stop portion 102 of the plunger 94, in which positions of the levers, particularly Fig. 5, the arcuate formations 93 thereof, which engage the glass window 17, will be in accurate alignment about the vertical axis of the base supporting member 51, anvil sleeve 55 and abutment member 53. Thus, the glass window 17 will be accurately concentrically aligned with the aperture 16 of the cup member 15.

Also reciprocably slidable in aligned apertures in the base arm 23 and the block 88 on the table 33 is a plunger 111 (Figs. 1, 2, 3 and 4) having a head 112 at its upper end above the upper surface of the base arm. The plunger 111 is similarly arranged relative to the base supporting member 51, anvil sleeve 55 and abutment member 53 as that of the plunger 94, described above. The plunger 111 is normally maintained in its uppermost position, as shown in Figs. 1 and 2, by a coiled compression spring 113 surrounding the plunger and engaging at opposite ends a lower annular surface of its head 112 and the upper surface of the base arm 23. An annular shouldered surface 114 on the plunger 11 abutting the lower surface of the base arm 23 limits the movement of the plunger 111 in an upward direction. At its lower end, the plunger 111 is cone-shaped, as indicated at 115, which is adapted, when the plunger 111 is depressed by an operator, to enter a space 118 formed between the opposed edge faces of the window aligning levers 91 and thus cause the levers to be similarly and simultaneously rocked about their pivots 87 to the positions thereof shown in broken outline in Fig. 4.

In the operation of the apparatus, and assuming that the table 33 is in its lowered position, with the plungers 24 and 94 in their upper positions, as shown in Figs. 1 and 2, and also that the plunger 111 has been depressed by the operator to cause the glass window aligning levers 91 to be rocked to their open and broken outline position (Fig. 4), and while the plunger is held depressed, an inverted cup-like metal member 15 is slipped onto the upper end of the supporting member 51 to the position shown in Figs. 8, 9 and 10. Thereafter, the levers 91 are permitted to return to their closed positions, as shown in full lines in Fig. 4, under the action of the spring 107, upon the operator permitting the plunger 111 to return to its uppermost position (Figs. 1 and 2) under the action of the spring 113. When the levers 91 return to their closed positions, the recessed faces 105 of the levers abut the tapered peripheral surface of the portion 102 of the plunger 94. In this position of the levers 91, as shown in broken outline in Fig. 8, the arcuate formations 93 thereof are so spaced apart that a glass window 17 may be freely slipped into position over the aperture 16 in the cup 15. After thus positioning the glass window 17, the plunger 94 is depressed to the position shown in Figs. 5 and 6, which is limited by the lower surface of the head 95 thereof abutting the upper surface of the base arm 23. This movement of the plunger 94 lowers the tapered portion 102 thereof and, it will readily be apparent, permits the spring pulled levers 91 to move further toward each other, thus positioning the arcuate formations 93 thereof in accurate alignment with the vertical axis of the base supporting member 51, anvil sleeve 55 and abutment member 53 (Figs. 5 and 8) and, in so doing, shifting the glass window 17 into coaxial alignment with the aperture 16 of the cup 15, if it is not so positioned. The operator then releases the plunger 94 and it returns to its upper position (Fig. 2).

With the cup 15 and glass window 17 assembled and accurately aligned, in the manner above described, the next step in the operation of the apparatus consists in elevating the table 33 to carry the cup and window into the field of the high frequency coil 45 (Figs. 7, 9 and 10). This is effected, as described hereinbefore, by rotating the crank handle 40 180° from the full line position to the broken outline position thereof, shown in Fig. 2. During the upward movement of the table 33, the lower tapered end of the plunger 111 enters the space 118 between the levers 91 and rocks them to the dotted outline position (Fig. 4) out of the way of the coil 45 and in advance of the cup 15 being moved into the hollow of the coil. No movement of the plunger 94 relative to the table 33 takes place during the elevation of the table. In this position of the table 33, the cup 15 will be heated by the coil 45 and, in turn, the peripheral edge of the glass window 17 will be heated principally by conduction from the heated cup sufficiently to render its edge plastic. When this has occurred, the plunger 24 is lowered and the anvil sleeve 55 raised in the manner previously described by rotating the hand crank 72 90° to enter the tapered portion 25 of the plunger 24 into the coil 45 and into engagement with the glass window 17. This positive movement of the plunger 24 pushes and inserts the glass window 17, having its peripheral edge plastic, into the aperture 16 of the cup 15 to the position shown in Fig. 10, wherein the lower surface of the glass window 17 is pressed against the upper end face of the abutment member 53. Upon the glass window 17 being thus positioned, the anvil sleeve 55 reaches the position shown in Fig. 10 to press against the molten edge area of the window to cause the overlapping indicated at 18 of the plastic peripheral edge of the window with the edges defining the aperture 16 of the cup 15, and thus firmly fixing the window in place.

To return the parts of the apparatus to their normal positions, the hand crank 72 is rotated 90° in either direction to cause a retraction of the plunger 24 and the anvil sleeve 55 from opposed surfaces of the window 17 and, thereafter, the crank handle 40 is rotated 180° to its full line position (Fig. 2) to lower the table 33. To remove the assembled sealed cup 15 and window 17 from the suporting sleeve 51, the plunger 111 is depressed to rock the levers 91 to their dotted outline positions (Fig. 4).

It is to be understood that the above-described arrangements are simply illustrative of the application of the principles of the invention. Numerous other arrangemets may be readily devised by those skilled in the art which will embody the principles of the invention and fall within the spirit and scope thereof.

What is claimed is:

1. An apparatus for assembling and sealing a glass element in an aperture of a metal part wherein the element is larger in diameter than the aperture comprising a base, a reciprocable hollow support for a part mounted on said base, heating means aligned with said support for heating the part in one position of said support, a plunger mounted on said base in alignment with the support and heating means for engagement with a glass element mounted on the metal part in alignment with the aperture therein, an abutment member coaxial with and movable with said support and having its abutment face spaced from the plane of one surface of the apertured part and its diameter less than that of the aperture, a reciprocable sleeve within the hollow support, surrounding said abutment member and having an anvil-like face adapted, upon being advanced, to press against the element, after the plunger has inserted the element into the aperture and against said abutment face, to cause the molten peripheral edges of the glass element to flow and overlap edges defining the aperture in the part to lock the element in the aperture, means for advancing said support to position the aligned part and element with respect to said heating means to heat the part and the rendering plastic of the peripheral edges of the element by conduction from the heated part, and cam actuated means for operating said plunger and sleeve in timed relation after said support is in its advanced position.

2. An apparatus for assembling and sealing a glass element in an aperture of a metal part wherein the element is larger in diameter than the aperture comprising a base, a reciprocable carrier mounted on said base having a hollow vertical extension and an upper end face for supporting in aligned relation therewith a metal part, heating means aligned with said end face for heating the part in one position of said carrier, a plunger mounted on said base in alignment with said end face for engagement with a glass element mounted on the metal part in alignment with the aperture therein, an abutment member mounted on said carrier coaxially aligned with and extending into said hollow extension and having its abutment face spaced from the plane of one surface of the apertured part and its diameter less than that of the aperture, a reciprocable sleeve within said hollow extension, surrounding said abutment member and having an anvil-like face adpated, upon being advanced, to press against the element, after an advance of the plunger, to insert the glass element into the aperture and against said abutment face, to cause the molten peripheral edges of the glass element to flow and overlap edges defining the aperture in the part to fix the element in the aperture, means for advancing said carrier to position the aligned part and element with respect to said heating means to heat the part and the rendering plastic of the peripheral edges of the element by conduction from the heated part, a pivotal lever mounted on said base for advancing said plunger, a second pivotal lever mounted on said carrier for advancing said sleeve, actuators movable on said base and carrier effective to operate said levers to advance said plunger and sleeve, and a rotatable cam on said carrier for operating said actuators in timed relation after said carrier is in its advanced position.

3. An apparatus for assembling and sealing a glass element in an aperture of a metal part comprising a support for the part, heating means for heating the part, means to press and seal the glass element heated by the part into the aperture of the part, means movable to locate the element with respect to the axis of the aperture in the part comprising a pair of opposed locating arms for engaging the element, spring means operable to urge said arms toward each other in element locating positions, each of said arms having an inclined face on opposed surfaces, said faces being oppositely inclined, and a plunger having a stop portion arranged between said oppositely inclined faces of said arms effective in one position to hold the arms similar distances from the axis of the aperture in the part and out of engagement with the element for freely receiving the element therebetween, said plunger in its other position permitting the arms to engage and shift the element to accurately locate it with respect to the axis of the aperture in the part.

4. An apparatus for assembling and sealing a glass element in an aperture of a metal part comprising a support for the part, heating means for heating the part, means to press and seal the glass element heated by the part into the aperture of the part, means movable to locate the element with respect to the axis of the aperture in the part comprising a pair of opposed pivotal locating arms for engaging the element, spring means eccentrically attached to said locating arms operable to urge said arms toward each other in element locating positions, a plunger effective to engage opposed surfaces of said arms to move the same apart to permit the part to be mounted upon said support, each of said arms having an inclined face on said opposed surfaces, said faces being oppositely inclined, and a manually advanced spring retracted plunger having a tapered peripheral stop portion arranged between said oppositely inclined faces of said arms effective in its retracted position to hold the arms similar distances from the axis of the aperture in the part and out of engagement with the element for freely receiving the element therebetween, said plunger in its advanced position permitting the arms to engage and shift the element to accurately locate it with respect to the axis of the aperture in the part.

5. An apparatus for sealing a glass element in an aperture of a metallic part comprising a stationary induction coil for heating the part when the element is in assembled relation therewith, a carrier for supporting an assembled element and part in alignment with the hollow of said coil and upon movement in one direction to carry the element and part into said coil, a crank mechanism for actuating said carrier, a pair of aligned compressing devices movable with respect to the carrier and arranged coaxially with the element and the aperture in the part at opposite surfaces of the element, and a second crank mechanism including a rotary cam member mounted on said carrier, said cam member being effective when the carrier has been actuated in said one direction and upon rotation to actuate said compressing devices in timed relation to first press one of said devices against one surface of the element to insert the element into the aperture of the part and then to press the second device against the opposite surface of the element to cause an overlapping of the molten peripheral edges of the glass element with the edges defining the aperture in the metallic part to fix the element in the part.

6. An apparatus for sealing a glass element in an aperture of a metallic part comprising a base, a stationary induction coil for heating the part when the element is in assembled relation therewith, a carrier slidable upon said base for supporting an assembled element and part in alignment with the hollow of said coil and upon movement in one direction to carry the element and part into said coil, a crank mechanism supported on said base for actuating said carrier, a pair of aligned plungers movable with respect to the carrier and arranged coaxially with the element and the aperture in the part at opposite surfaces of the element, one of said plungers being slidable in said base and the other plunger being slidable in said carrier, a crank and an attached cam member mounted for rotation on said carrier, said cam member being effective when the carrier has been actuated in said one direction and upon rotation to actuate said plungers in timed relation to first press one of said plungers against one surface of the element to insert the element into the aperture of the part and then to press the second plunger against the opposite surface of the element to cause an overlapping of the molten peripheral edges of the glass element with the edges defining the aperture in the metallic part to fix the element in the part.

7. An apparatus for sealing a glass element in an aperture of a metallic part comprising a base, a stationary induction coil for heating the part when the element is in assembled relation therewith, a carrier slidable upon said base adapted to support a part and an element in juxtaposed relation in alignment with the hollow of said coil and upon movement in one direction to carry the element and part into said coil, a crank mechanism supported on said base for actuating said carrier, a crank shaft carried by said carrier, a cam member mounted on said shaft for actuation thereby, a plunger carried by said carriage, a second plunger mounted independent of said carrier on said base, said plungers being coaxially arranged with respect to each other and with the element and the aperture in the part at opposite side faces of the element, and a pair of movable operative connections between said cam and plungers supported on said base and carrier, said cam member being effective when the carrier has been actuated in said one direction and upon rotation to actuate said operative connections to cause said plungers to act upon opposite surfaces of the element to fix it in the aperture of the part.

8. In an apparatus for affixing a glass disc in a circular aperture of a metallic part, a stationary induction coil positioned to surround a portion of the metallic part and the glass disc when these two parts are in assembled relation, a movable carrier for supporting the glass disc and metallic part, means on the carrier for effecting the alignment of the disc with the aperture of the metallic part, a movable plunger operable to force the disc into the aperture, a crank mechanism for actuating said carrier to move the disc and metallic part into the coil, a second crank mechanism for actuating the plunger, and a compressing device movable with respect to the carrier for actuation by said second crank mechanism to cooperate with the plunger to press the disc into the aperture.

9. In an apparatus for affixing a glass disc in a circular aperture of a metallic part, a stationary induction coil positioned to surround a portion of the metallic part and the glass disc when these two parts are in assembled relation, a movable carrier for supporting the glass disc and metallic part, means on the carrier for effecting the alignment of the disc with the aperture of the metallic part, a movable plunger operable to force the disc into the aperture, a crank mechanism for actuating said carrier to move the disc and metallic part into the coil, a second crank mechanism for actuating the plunger, a compressing device movable with respect to the carrier for actuation by said second crank mechanism to cooperate with the plunger to press the disc into the aperture, and means for releasing said aligning means from the disc comprising a second plunger slidable with respect to the carrier.

10. In an apparatus for affixing a glass disc in a circular aperture of a metallic part, a stationary induction coil positioned to surround a portion of the metallic part and the glass disc when these two parts are in assembled relation, a movable carrier adapted to support a metallic element and glass disc in juxtaposed relation, a crank shaft carried by said carrier, a cam mounted on the crank shaft for actuation thereby, a plunger carried by the carrier, a second plunger mounted independent of said carrier, actuating means on the carrier for actuating one of said plungers, actuating means independent of the carrier for actuating the other plunger, and means on the carrier for associating both of said actuating means with said cam for actuation thereby when the carrier is in raised position.

CARL E. HANSEN.
JAMES W. JUVINALL.

No references cited.